United States Patent [19]

Wojdylo

[11] Patent Number: 5,031,861
[45] Date of Patent: Jul. 16, 1991

[54] SYSTEM FOR SERVING AND COLLECTING ITEMS ON BOARD AN AIRCRAFT

[76] Inventor: Henry K. Wojdylo, P.O. Box 8040, Honolulu, Hi. 96830

[21] Appl. No.: 453,798

[22] Filed: Dec. 20, 1989

[51] Int. Cl.$^5$ .............................................. B64D 11/00
[52] U.S. Cl. .................................. 244/118.5; 186/46; 186/40
[58] Field of Search ............................ 244/118.1, 118.5; 186/40, 45, 46; 104/172.1

[56] References Cited

U.S. PATENT DOCUMENTS

| D. 225,032 | 10/1972 | Gonslaves . | |
| D. 277,040 | 1/1985 | Dehne . | |
| 1,992,861 | 2/1935 | Demos | 186/46 |
| 3,102,607 | 9/1963 | Roberts | 244/118.5 X |
| 3,113,659 | 12/1963 | Oda . | |
| 3,179,208 | 4/1965 | Umanoff | 244/118.5 |
| 3,295,635 | 1/1967 | Cahn | 186/40 |
| 3,464,363 | 9/1969 | Wishart | 186/46 X |
| 3,999,630 | 12/1976 | McPhee | 244/118.5 X |

FOREIGN PATENT DOCUMENTS

| 1394191 | 7/1965 | France . |
| 1231092 | 5/1971 | United Kingdom . |

*Primary Examiner*—Joseph F. Peters, Jr.
*Assistant Examiner*—Carla Mattix
*Attorney, Agent, or Firm*—Terry M. Gernstein

[57] ABSTRACT

A system for serving and collecting items on board an aircraft includes a track located overhead and a container assembly that is pendently supported from that track. The container assembly includes a handle for manually moving the assembly and a motorized unit. The motorized unit also includes a circuit for causing the assembly to stop according to a preprogrammed sequence and to return to a galley area.

1 Claim, 6 Drawing Sheets

SYSTEM FOR SERVING AND COLLECTING ITEMS ON BOARD AN AIRCRAFT

TECHNICAL FIELD OF THE INVENTION

The present invention relates to the general art of dispensing, and to the particular field of dispensing and collecting items in an airplane passenger cabin.

BACKGROUND OF THE INVENTION

Many aircraft flights include the serving of food and drink items as well as the dispensing of various other items, such as magazines and the like. Serving and dispensing items also requires collection of such items sometime before the flight lands. At present, both the distribution and collection of items requires one or more flight attendants to traverse the aisle in the passenger cabin. On large airplanes, several flight attendants will be in the aisle at the same time carrying out various tasks. This situation can create a serious congestion problem, especially if one or more passengers attempts to use the aisle.

Such congestion not only can be annoying to other passengers, especially if they are trying to watch an in-flight movie, it is an inefficient way to dispense and collect items. While most flight attendants are extremely efficient, this manual dispensing and collecting process is limited and such limitations are especially apparent on either large planes or on short flights.

Therefore, there is a need for a system for serving and collecting items on board an aircraft which is efficient, out of the way, and can be used by one or two flight attendants even in large airplanes or on short flights to dispense food and other items to the passengers and to collect items associated therewith without generating congestion in the aisle of the passenger cabin.

OBJECTS OF THE INVENTION

It is a main object of the present invention to provide a system for serving and collecting items on board an aircraft.

It is another object of the present invention to system for serving and collecting items on board an aircraft which is efficient.

It is another object of the present invention to system for serving and collecting items on board an aircraft which is efficient and yet is still out of the way.

It is another object of the present invention to system for serving and collecting items on board an aircraft which is efficient and yet is still out of the way and can be used by one or two flight attendants.

It is another object of the present invention to system for serving and collecting items on board an aircraft which is efficient and yet is still out of the way, and can be used by one or two flight attendants even in large airplanes or on short flights.

It is another object of the present invention to system for serving and collecting items on board an aircraft which is efficient and yet is still out of the way, and can be used by one or two flight attendants even in large airplanes or on short flights without generating congestion in the aisle of the passenger cabin.

SUMMARY OF THE INVENTION

These, and other, objects are achieved by a system for serving and collecting items on board an aircraft which includes an overhead track mounted in the ceiling of an airplane passenger cabin and a serving assembly pendently mounted on that overhead track. The serving assembly is moved along the track and items to be dispensed are stored in a container of the serving assembly while collected items can also be stored in that assembly as well. The assembly also is motor driven and includes a control means whereby the stop off points of the overall path can be programmed.

In this manner, a single flight attendant can load several serving assemblies in a galley area within the passenger cabin and send those loaded assemblies off to stop at pre-programmed locations. Other assemblies will be returning while some assemblies are being loaded, so the overall process can be essentially continuous and can be carried out without requiring flight attendants to move in the aisle.

BRIEF DESCRIPTION OF THE DRAWING FIGURES

DETAILED DESCRIPTION OF THE PREFERRED EMBODIMENT OF THE INVENTION

Figure 1:
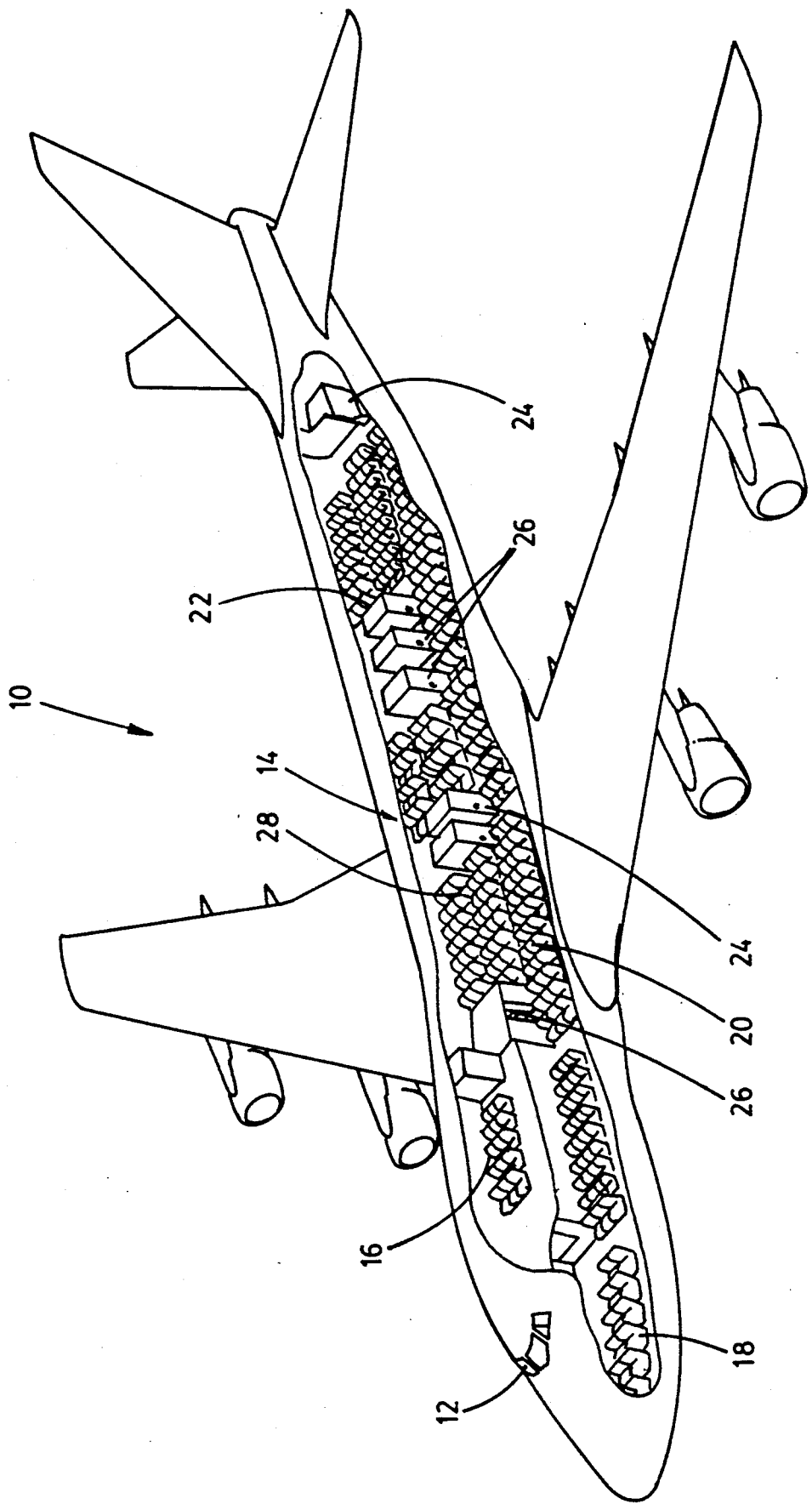
FIG. 1 is perspective view of a typical airplane on which the present invention can be used.

Shown in FIG. 1 is a typical airplane 10 used by many airlines for long flights. The airplane 10 includes a flight deck 12 in the forward end of the plane, and a passenger section 14. The passenger section 14 is divided into an upper lounge area 16, a first class section 18, a business class section 20 and an economy class section 22. The passenger cabin also includes lavatories 24, and galley modules 26. The passengers sit in seats that are arranged into a plurality of rows and aisles, such as aisle 28, separate the seats in a single row. Passenger and flight attendant traffic moves in the aisles during the flight.

The airplane also includes a ceiling (not shown) that covers the passenger compartment.

During a flight, one or all of the aisles will carry traffic, such as passengers and flight attendants. Also during a flight, flight attendants will be moving large and bulky carts in the aisles to serve food and to remove items associated with such meals. This traffic is annoying to many passengers and is quite inefficient as a means of serving and removing food during a flight.

The present invention provides a means for alleviating much, if not all, of the traffic associated with the serving and removing of food and its associated items, as well as with the dispensing of a variety of other items to the passengers.

Figure 2:
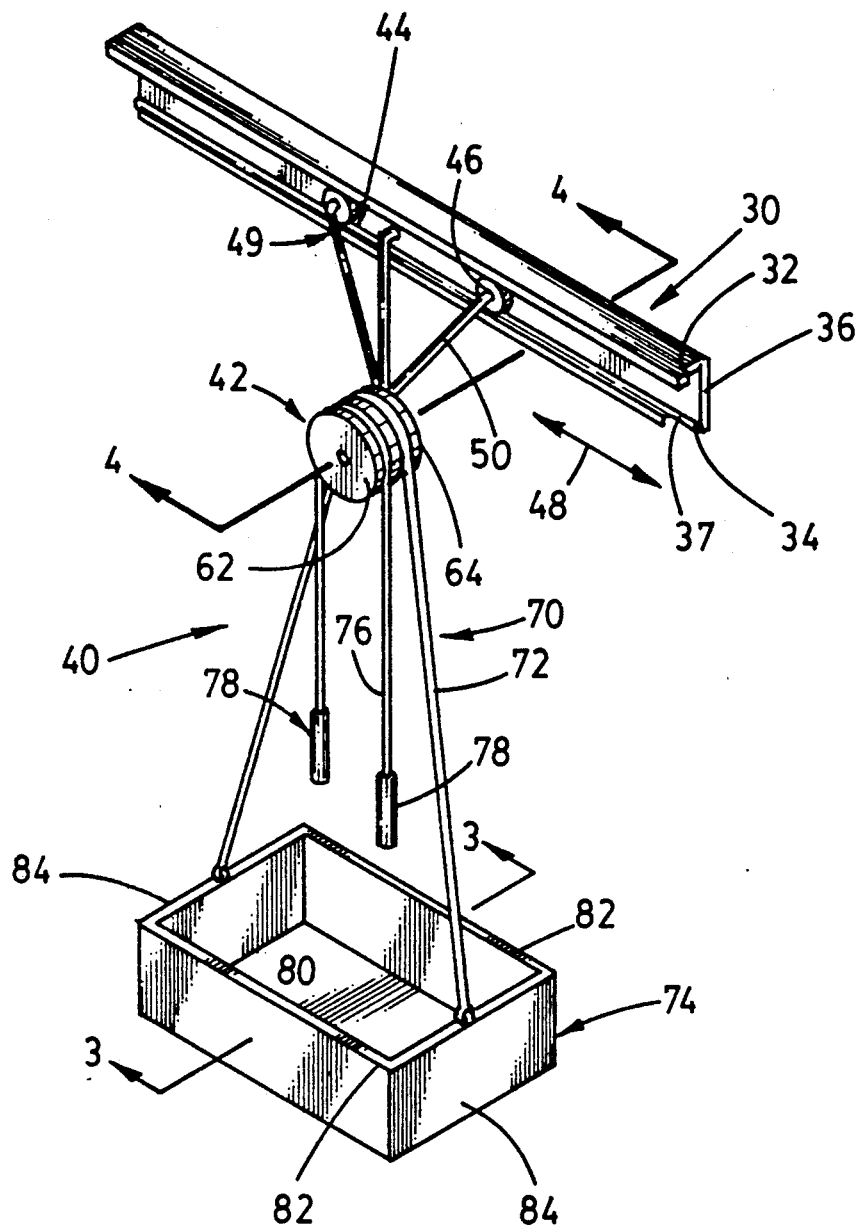
FIG. 2 is a perspective view of a manual serving assembly.
Figure 3:
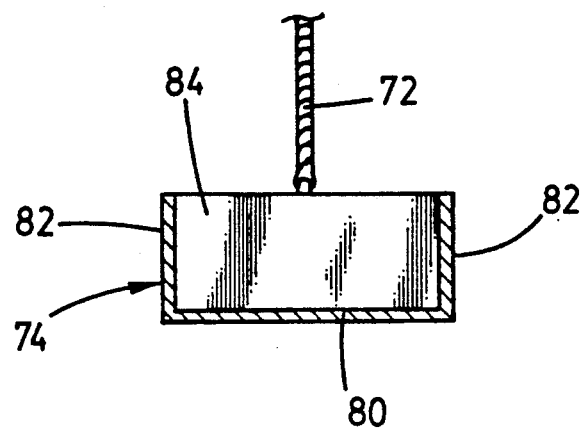
FIG. 3 is a sectional view taken along line 3—3 of FIG. 2.
Figure 4:
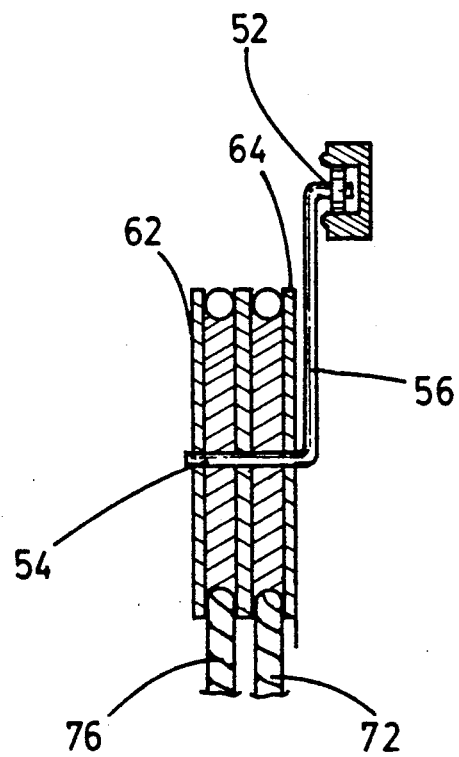
FIG. 4 is a sectional view taken along line 4—4 of FIG. 2.
Figure 5:
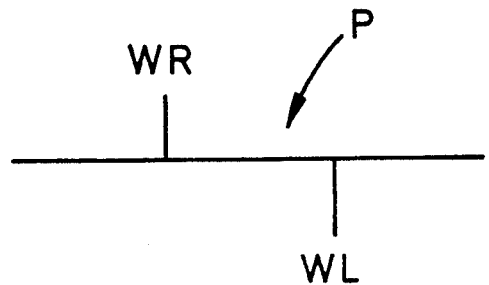
FIG. 5 is a plan view of a straight track.
Figure 6:
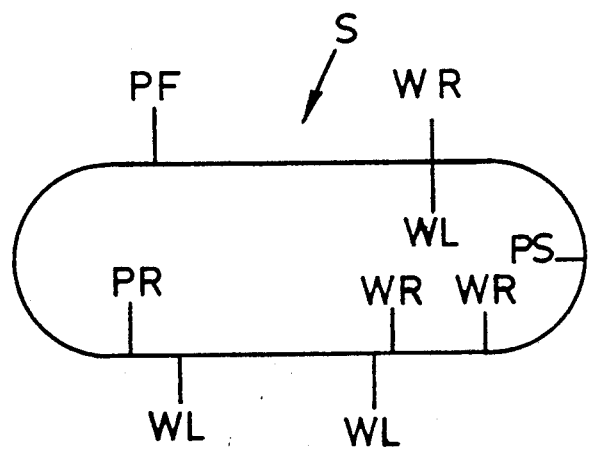
FIG. 6 is a plan view of a curved track.
Figure 8:
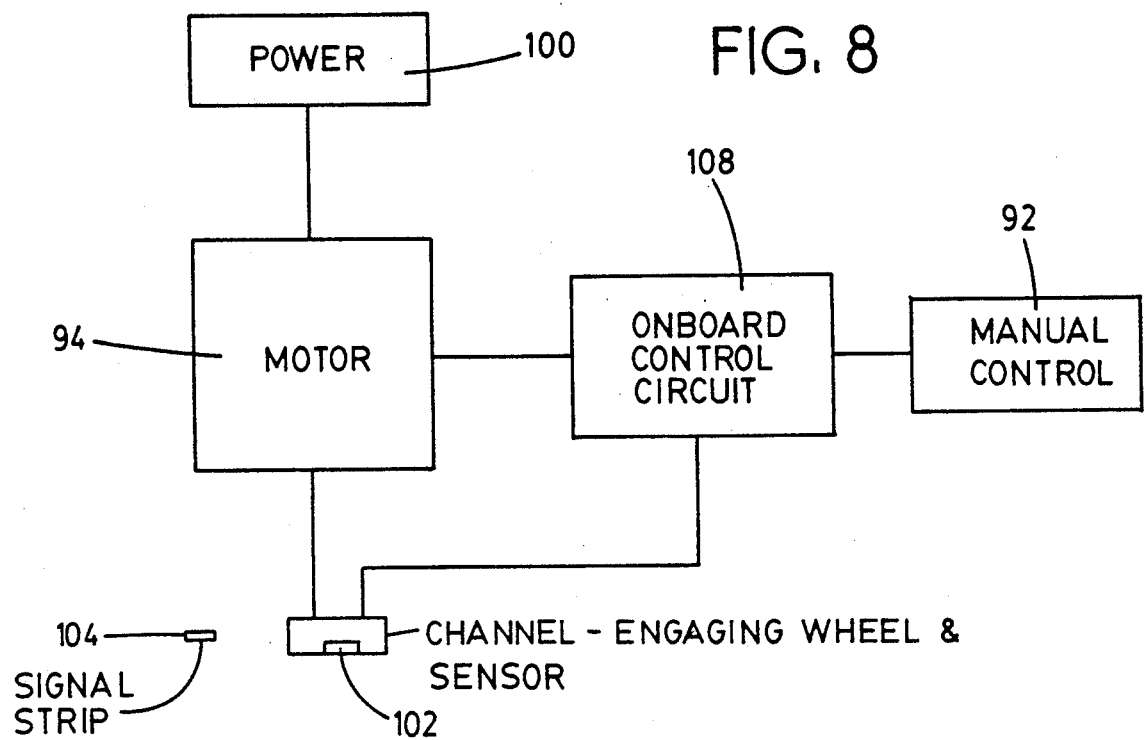
FIG. 8 is a block diagram of a control system used in conjunction with the motor operated serving assembly.

A manual form of the invention is shown in FIGS. 2, 3 and 4. The manual form of the invention includes an overhead track 30 that is mounted in the ceiling of the passenger cabin to extend along the aisles. This overhead track is generally C-shaped to have a top 32, a bottom 34 and a bight section 36 that forms an open channel. A suitable lip 37 is also attached to the bottom. The channel can extend along the longitudinal centerline of the aisle in a straight line path S as shown in FIG. 5, or can be oval in shape as shown by prolate ellipse path P in FIG. 6. The path P includes a forward section PF, a rearward section PR and return sections PS on each end. The path P forms a closed loop, and the straight path S forms an open path, and both paths extend along an aisle between the rows of seats, with one end located adjacent to one of the galley modules. The paths can also be arranged to have one end at one galley module, and the other end at another galley module. Each row of seats forms a work station along the path. The workstations are denoted on the paths as WR and WL which correspond to the row of seats on the right of the path and on the left of the path respectively.

The system also includes a serving assembly 40 that is pendently supported from the overhead track to hang down into the aisle area. Food and other items are stored in the serving assembly and are dispensed to the passengers at each work station, and other items are collected from the passengers at each work station. The serving assemblies traverse the paths to and from the galley modules to be filled or emptied as appropriate by flight attendants stationed at those galley modules.

Figure 9:
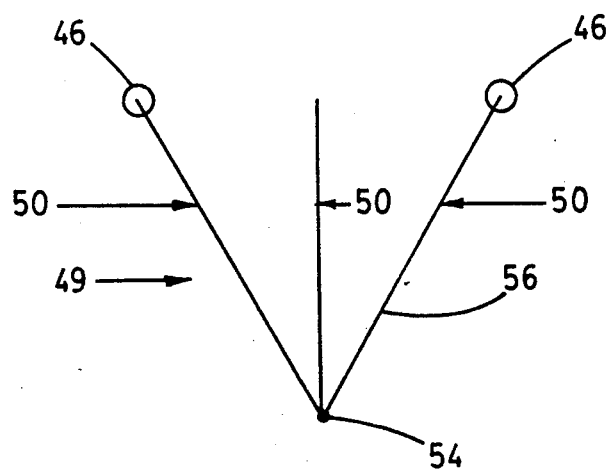
FIG. 9 is an elevational view of a fan-shaped bracket assembly.

The manual form of the serving assembly includes a support unit 42. The support unit 42 includes a wheel assembly 44 having wheels, such as wheel 46, rollably mounted in the channel to move along that channel in the directions indicated in FIG. 2 by the double-headed arrow 48. The wheels are connected to an axle bracket assembly 49 that is a monolithic, one-piece element and includes a plurality of Z-shaped axle brackets, such as bracket 50, also shown in FIG. 4. The monolithic, one-piece nature of the assembly 49 ensures strength of the support which is needed since the overall structure may be quite heavy. Each of the assembly brackets has one end 52 located in the channel, and one end 54 extending beneath the channel and the ends 52 and 54 are connected together by a section 56 that extends vertically from the channel. The brackets 50 converge together to form a single pulley axle that corresponds to the end 54 shown in FIG. 4. Thus, the overall assembly 49 is fan shaped as can be seen by comparing FIGS. 4 and 9. A Z-shaped guide bracket 58 is positioned between the axle brackets and also has one end formed by the axle pulley.

First and second pulleys 62 and 64 are rotatably mounted on the pulley axle and can rotate in a vertical plane about the pulley axle.

The serving assembly further includes a harness unit 70 that has a strap 72 trained over the pulley 64 and has its ends attached to a container 74 to support that container over the level of the floor of the passenger cabin at a height that is convenient to the passengers seated in the seats of the rows at the various work stations. A handle strap 76 is trained over the pulley 62 and includes handles 78 on each end thereof. The handles are used to pull the serving assembly along the track.

The container 74 includes a bottom 80, two end walls 82 and two side walls 84 that combine to form an open-topped container into and out of which food and other items can be moved.

The serving assembly is moved along the track to the various work stations by a flight attendant who pulls that assembly along. Only one attendant is required to move the serving assembly since it is supported above the floor and will not catch on carpeting or on the seats. Moving a pendently supported item is also generally easier than pushing a heavy cart.

Figure 7:
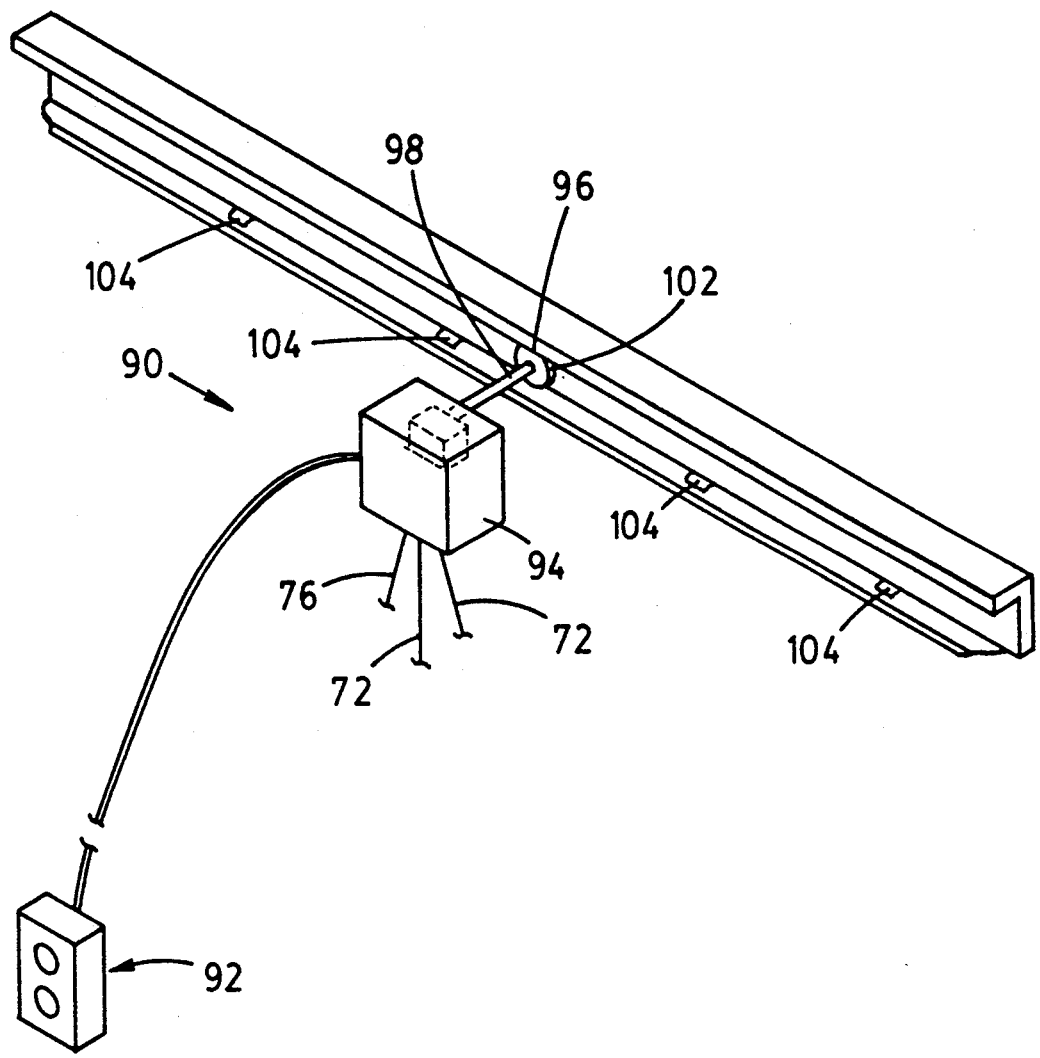
FIG. 7 is a perspective view of a motor operated serving assembly.

A motorized serving assembly 90 is shown in FIG. 7 and includes the above-discussed harness unit and a handle as well for manual operation. The assembly 90 rides in the same overhead tracks as the manual unit, but is operated by a motor and is controlled by a program stored in a microprocessor or microcomputer unit. The assembly 90 is programmed to stop at any work station along the track to dispense items or to pick up items, and can be programmed to stop at the work stations in a sequential manner.

Thus, for example, the container 74 can be filled with a plurality of meals by a flight attendant located at a first galley, and the assembly 90 programmed to stop at each of the first several work stations located near the forward return end PS of the path, and to then return to the first galley or to stop at the galley located near that forward return end to be loaded with further items. Several flight attendants can be located at each galley to load and unload assemblies as they arrive and depart from the galley. Thus, the only traffic moving in the aisle is the assemblies which move above the floor. Passengers or others can easily walk around such vehicular traffic. The assemblies can also be controlled to stop at a particular work station or can be programmed to stop at a work station that has a special stop signal activated by a passenger whereby special items can be dispensed to that passenger or received from that passenger. Such special stop signal can be associated with the flight attendant call button if suitable The program can include a signal on the call button for magazines, drinks, food or the like so that the proper item can be loaded into the assembly at the galley for dispensing to the passenger.

Also, if suitable, the assembly 90 can include a handheld control unit 92 that is operated by a flight attendant walking beside the assembly as it moves along the aisle, and can also have a handle for manually moving the assembly when desired.

The motorized assembly 90 includes a motor unit 94 connected to a wheel 96 by a suitable drive shaft 98 via a suitable connection, such as gearing and gear reducers and the like. The drive shaft 98 may not be as long as shown in FIG. 7, but such showing is for the sake of clarity. The wheel is driven by the motor and thus moves the assembly along the track. Power is supplied by a power source 100 to the motor. The wheel has a stop signal receiving strip 102 located therein that contacts the channel as the wheel turns. A plurality of signal strips 104 are mounted on the track and are engaged by the signal receiving strip 102 as the wheel rolls over the channel and over the signal strips 104. The signal strips 104 are activated to generate a stop signal that is sensed by the stop signal receiving strip 102. Each strip 104 generates a signal that is characteristic of the particular row of seats located adjacent thereto. Thus, for example, the first row of seats adjacent to the galley will have a special stop signal associated therewith, and the second row of seats will have another stop signal associated therewith, and so on.

The assembly 90 also includes an on board control circuit means 108 that includes a microprocessor or a microcomputer that can be programmed to look for a special stop signal or can be programmed to stop at several stop signals in a sequential manner or the like.

The control circuit means will also be programmed to power the motor unit after the stop signal is cleared, such as by the assembly stopping and then being gently pushed past the work station. The circuit then is programmed to return the assembly to the galley and then stop it. The assembly can also be programmed to move to a special stop signal, such as a stop signal generated by a passenger activating the call button associated with his seat. Other combinations can be used, and will not be discussed as they will be evident to those skilled in the art based on the disclosure presented herein.

The hand-held unit can be used in an over-ride manner so that an attendant can over-ride the pre-programmed sequence of movement of the assembly. The hand-held unit can also include circuit means for programming the assembly if suitable.

It is understood that while certain forms of the present invention have been illustrated and described herein, it is not to be limited to the specific forms or arrangements of parts described and shown.

I claim:

1. A system for serving and collecting items on board an aircraft comprising:
   A) an overhead track mounted in an overhead ceiling of an aircraft passenger cabin, said track being in the form of a prolate ellipse and having a forward section, a rearward section and end return sections connecting said forward and rearward sections together, said return sections being located at opposite ends of the passenger cabin and one of said return sections being positioned adjacent to a galley area of the passenger cabin;
   B) a serving assembly pendently supported from said overhead track and including
      (1) a support unit movably mounted in said overhead track, said support unit including
         (a) a wheel assembly having a plurality of wheels rollably mounted in said overhead track,
         (b) a one-piece wheel support unit that includes a plurality of Z-shaped wheel axles having one end projecting into said overhead track, a connecting portion and one end that is common to all of said wheel axles whereby said wheel support unit forms a fan shape,
         (c) a Z-shaped guide bracket having one end located between said wheel axles and projecting into said overhead track, a body and a second end that is common with said wheel axle common one end,
         (d) said common end forming a pulley support axle, and
         (e) first and second pulleys mounted on said pulley support axle,
      (2) a harness strap trained around said first pulley and having ends thereof located just above floor level of the passenger cabin,
      (3) a container attached to said harness strap ends, and
      (4) a handle strap trained around said second pulley and having handles located near said container.

* * * * *